United States Patent [19]

Muck et al.

[11] Patent Number: 4,664,645
[45] Date of Patent: May 12, 1987

[54] BLADE SHAFT DRIVE ASSEMBLY

[75] Inventors: Wendell C. Muck, Leawood, Kans.; Darrell Yelton, Lee's Summit, Mo.

[73] Assignee: Federal-Mogul Corporation, Southfield, Mich.

[21] Appl. No.: 828,803

[22] Filed: Feb. 12, 1986

[51] Int. Cl.⁴ .............................................. F16H 7/02
[52] U.S. Cl. ..................................... 474/84; 474/159; 299/39
[58] Field of Search ....................... 474/84, 85, 86, 72, 474/149, 159, 148; 299/39

[56] References Cited

U.S. PATENT DOCUMENTS 3,217,552 11/1965 Daub ................................ 474/159 X
4,074,447 2/1978 Shivers, Jr. et al. ............. 299/39 X
4,269,450 5/1981 Welborn ................................ 299/39
4,310,198 1/1982 Destree ................................ 299/39

Primary Examiner—Stephen J. Novosad
Assistant Examiner—Thuy M. Bui
Attorney, Agent, or Firm—Lawrence J. Shurupoff; Robert F. Hess

[57] ABSTRACT

A pavement cutting saw is provided with a power train for accommodating high horsepower engines. A combination of pulleys, gears and coacting drive belts allows high horsepower to be delivered to a cutting tool while enabling the cutting tool to effect a deep cut and while avoiding interference between the pavement surface and any power train components. The power train may be arranged as a two-step speed reduction system to enable the engine to run at relatively high operating speeds and to allow the blade to rotate within a preferred speed range.

9 Claims, 2 Drawing Figures

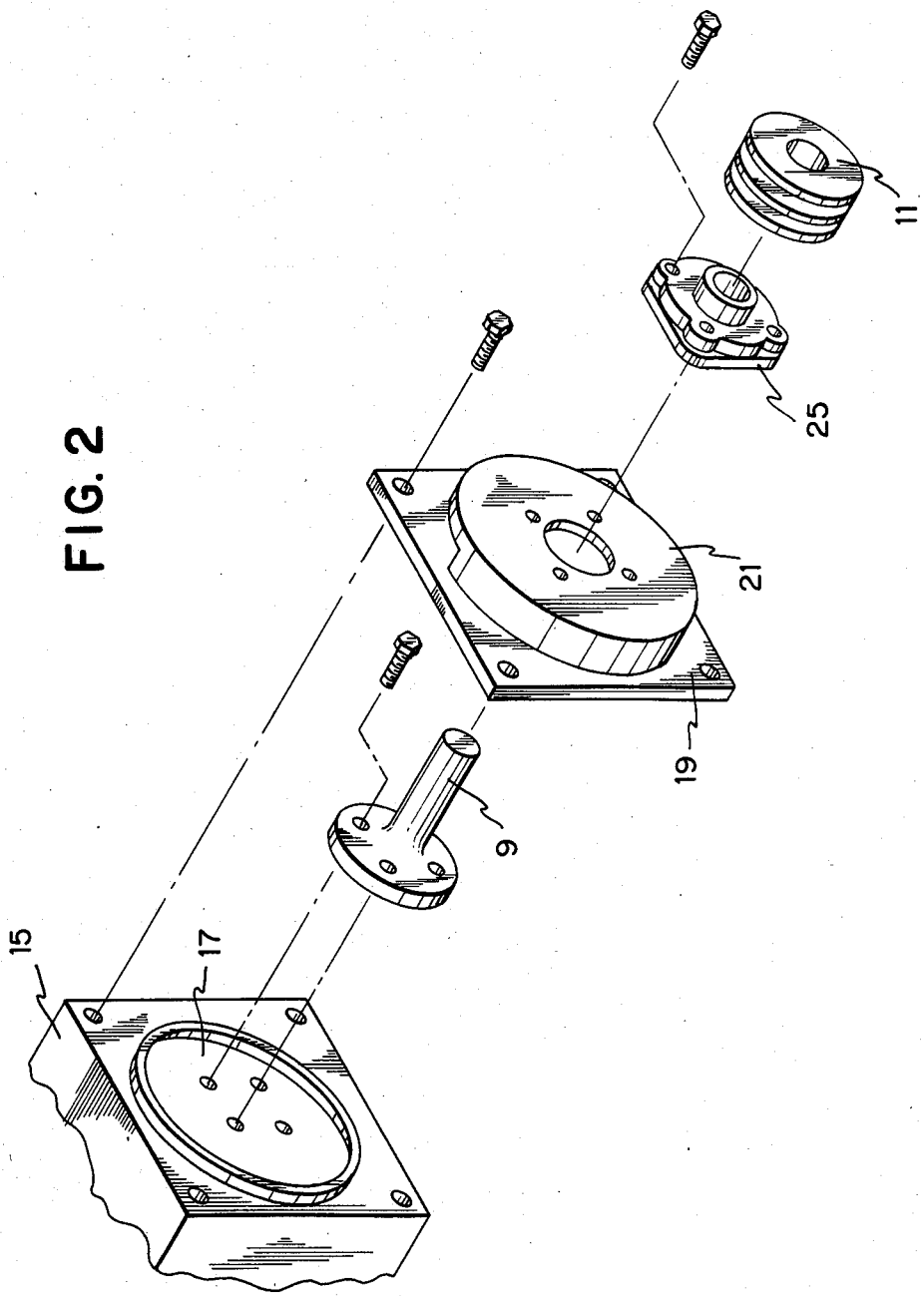

BLADE SHAFT DRIVE ASSEMBLY

BACKGROUND OF THE INVENTION

1. Field of the Invention

This invention generally concerns a power train for transmitting power from an internal combustion engine to a rotating cutting blade and particularly relates to a double reduction power transmission system using a combination of toothed and toothless pulleys respectively coacting with toothed and toothless transmission belts for driving high horsepower cutting machinery.

2. Description of Prior Developments

Self-propelled concrete saws are well knosn and have been used for many years. Heretofore, such self-propelled saws have used a system of v-belts and friction pulleys for transmitting power directly from a prime mover to a cutting blade drive shaft. An example of such an apparatus is disclosed in U.S. Pat. No. 3,417,638, which is incorporated herein by reference.

The current demand for greater cutting rates has necessitated the transmission of greater power from a prime mover to a cutting blade through a conventional power train. However, known pulley and belt systems designed for lower power transmission slip and/or break under higher loads. In the past, the solution to this problem has been to add additional pulleys and v-belts to the engine power takeoff shaft and to the blade drive shaft in order to distribute the greater power over more belts and pulleys.

However, as more and more pulleys and belts are added, the amount of power transmitted to the blade shaft does not increase proportionally and a condition of "diminishing returns" results. Moreover, space considerations often preclude the use of numerous pulleys and belts. This space problem has been overcome through the use of larger diameter pulleys which improve the ability of each v-belt to transmit power through greater contact arcs on each coacting pulley.

The use of larger pulleys frequently created another problem. Since such pulleys are typically mounted on the same shaft upon which the cutting blade is mounted, the useful cutting depth of the blade would be decreased due to the outer diameter of the pulley contacting the surface being cut.

Moreover, by mounting a larger pulley on the power takeoff shaft of the engine, the operating speed of the engine had to be reduced in order to run the cutting blade at a preferred speed. This condition often resulted in the engine running within inefficient low speed and low horsepower ranges. While a gear and chain drive would significantly reduce the pulley pavement interference problem through the mounting of a smaller diameter gear on the blade shaft, chains are poorly suited to high speed applications such as those intended to be carried out by the present invention. At high speeds, chains have been known to break apart thereby creating an extremely dangerous condition.

Accordingly, a need has risen for a power transmission system capable of safely and efficiently transmitting power in the range of 100 horsepower from a prime mover to a drive shaft for driving a cutter blade.

SUMMARY OF THE INVENTION

The present invention is primarily designed as an improvement over prior v-belt blade drive systems and is particularly suited for use in a self-propelled concrete saw such as that disclosed in U.S. Pat. No. 3,417,638.

A primary object of the invention is to provide a power drive system for driving a rotating cutting blade wherein power transmission losses are minimized and engine efficiency is maximized.

Another object of the invention is to provide a double reduction drive system for increasing engine torque wherein a first reduction of speed is attained through a v-belt pulley system and a second reduction of speed is attained through a toothed belt and gear drive system.

A further object of the invention is to provide a power train which facilitates the interchange of various sized pulleys mounted on a power takeoff shaft, as is required to optimally match the speed of the blade shaft to cutting blades of varying diameter.

Yet another object of the invention is to provide a drive system for a high power concrete saw which incorporates the desirable features of both a v-belt pulley drive and a toothed belt and gear drive while minimizing the disadvantages of such drives.

Still another object of the invention is to increase blade shaft bearing life by reducing the load on such bearings as is typically applied by the tension generated by a v-belt.

Another object of the invention is to provide a double reduction drive system which allows higher engine operating speeds to be maintained during cutting operations thereby allowing the engine to run at more efficient speed and to produce higher horsepower.

A further object of the invention is to provide maximum blade cutting depths by minimizing the diameter of the power transmission component mounted on the blade shaft.

The realization of these objects and various other objects, features and attendant advantages of the present invention will be more fully appreciated from the following detailed description when considered in connection with the accompanying drawings, in which the same reference numbers designate the same or corresponding parts throughout.

BRIEF DESCRIPTION OF THE DRAWINGS

In brief, the drawings include:

FIG. 2, which is an exploded perspective view of the power takeoff portion of the assembly.

DETAILED DESCRIPTION OF THE PREFERRED EMBODIMENTS

Figure 1:
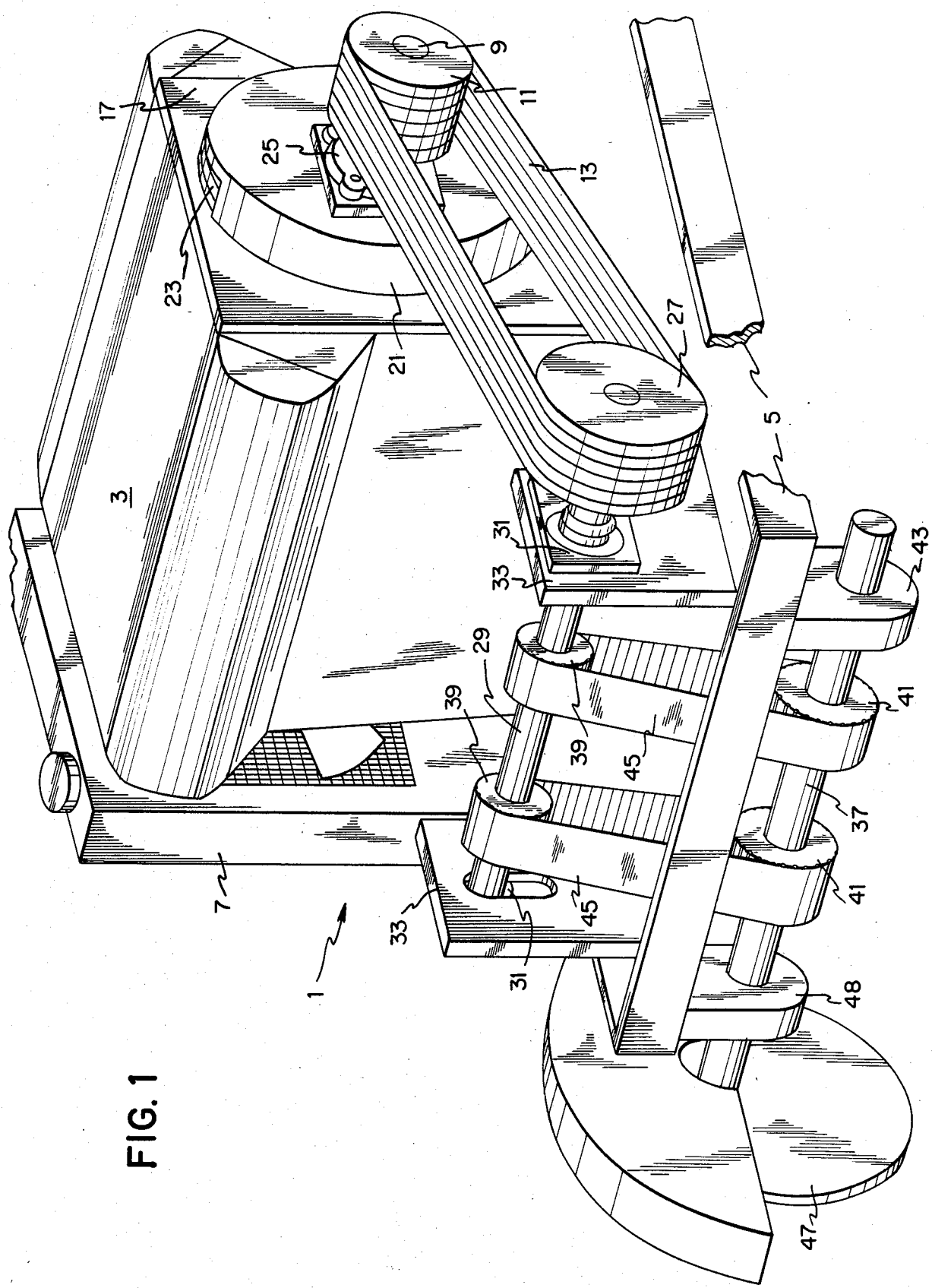
FIG. 1, which is a perspective fragmentary view of a preferred embodiment of the drive train as mounted on a self-propelled concrete saw.

The power train developed in accordance with the present invention will now be described in conjunction with the accompanying FIG. 1 within which, for example, it is seen that a self-propelled concrete saw (1) is provided with a prime mover such as an internal combustion engine (3) which is mounted on saw frame (5). The engine is preferrably a water-cooled engine provided with a radiator (7). Although air-cooled engines have typically been used for such applications in the past, a water-cooled engine is preferred due to its ability to maintain a relatively constant operating temperature. This facilitates the maintenance of accurate emission controls.

As further seen in FIG. 1, the engine is provided with a cantilevered shaft extension (9) to which is fitted a plurality of first pulleys (11) for transmitting power to a plurality of v-belts (13). While a single pulley and belt system could be provided, it is more practical to use several pulleys especially when transmitting high horsepower in the range of 75 to 100 horsepower, as is intended in the preferred embodiment.

A more detailed view of the cantilevered shaft arrangement is shown in FIG. 2 wherein engine crankcase (15) surrounds flywheel (17) to which is secured the cantilevered shaft extension (9). A power takeoff support bracket (19) is bolted to the crankcase such that the shaft extension projects through the support bracket. A bell housing (21) may be provided on the support bracket (19) to accommodate an auxiliary pulley (23) which may be used to drive or propel the concrete saw drive wheels along the pavement. A flanged bearing (25) is shown mounted to the bell housing (21) for supporting the shaft extension (9). The first set of pulleys (11) are then secured to the shaft extension (9) in a known manner.

The pulley changing process is greatly simplified by mounting the pulleys (11) outboard of the flange bearing (25). In the past, such pulleys were typically mounted inboard of the flanged bearing (25) so that the bearing had to be removed before the pulleys could be changed. These pulley changes are necessitated by changes in the diameters of various cutting blades. That is, in order to maintain a proper or optimum blade surface cutting speed on various blades of varying diameters, the diameter of the pulleys (11) should be changed accordingly. The cantilevered shaft design allows unobstructed access to these pulleys during installation and interchange procedures.

As further seen in FIG. 1, the v-belts (13) are connected to a second set of v-belt pulleys (27) which are mounted upon jack shaft (29). In order to allow the engine to operate at a relatively high power output and at an efficient speed, a speed reduction between pulleys (11) and (27) is provided, preferably on the order to 2.5 to 1. Jack shaft 29 is rotatably mounted within a pair of jack shaft bearings (31) which in turn are mounted upon vertical shaft support plates (33). Shaft support plates (33), which are mounted to the frame (5) are each provided with clearance holes (35) for allowing tension adjustment and alignment of the jack shaft with respect to both the shaft extension (9) and the blade drive shaft (37). Jack shaft (39) should be aligned substantially parallel with respect to shaft (9) and shaft (37).

A pair of first jack shaft gears (39) is shown mounted to the jack shaft symmetrically between the shaft plates (33). A second pair of blade drive shaft gears (41) is mounted to shaft (37) symmetrically between blade drive shaft bearings (43). A pair of internally splined or toothed flexible high torque belts (45) are provided for positively transmitting power from the jack shaft to the blade drive shaft without slippage. Belts (45) may be formed of a plastic or elastomeric material. This arrangement distributes power evenly along the blade shaft, relieves side loading on the shaft and reduces shaft whip.

A further drive reduction between gears (39) and (41) may be provided, and in the preferred embodiment this reduction may range from 1.2 to 1 to 1.5 to 1. Belts (45) are designed to last for the life of the machine and should not require replacement. While two belts are shown in FIG. 1, any number may be used, depending upon the specific power output of the prime mover.

An important feature of the invention is the disposition of the jack shaft above the blade drive shaft so that the second set of v-belt pulleys (27) may be dimensioned with diameters far greater than those heretofore possible in order to transmit greater power. This added vertical clearance between the outer circumference of the pulleys (27) and the pavement surface being cut allows the number of pulleys (11) and (27) to be minimized by allowing for fewer pulleys with larger pulley diameters. As stated above, in order to transmit greater power, either the number of pulleys may be increased or the diameter of the existing pulleys may be increased. Current power requirements have now exceeded the number of relatively small diameter pulleys which may be practically installed on a single shaft due to space and cost considerations and therefore the necessity of larger diameter pulleys arises.

Prior drive arrangements have simply used a single set of adjacent v-belts connected between two sets of ganged pulleys, one set mounted on the power takeoff shaft of the engine and the other set directly mounted to the blade drive shaft. However, by increasing the diameter of the pulley on the blade drive shaft to accommodate higher horsepower, the usable cutting depth of the blade would be decreased due to interference of the outer circumference of the pulley with the cutting surface. This interference would prevent further vertical penetration of the blade into the pavement. In order to avoid this condition, the two-stage power reduction assembly has incorporated both v-belts and v-pulleys in combination with toothed gears and mating internally toothed belts.

This arrangement presents several advantages not immediately appreciated. A major advantage is the ability to use toothed gears (41) having a diameter far less than that required of a v-belt pulley for transmitting equal horsepower. As suggested above, this allows for a far deeper cut with a rotary tool or blade (47) before the gear may interfere with or contact the pavement surface. Since the toothed gears and belts do not rely on belt tension to frictionally transmit power from the jack shaft to the blade drive shaft, the tension loads on the jack shaft bearings the blade drive shaft bearings are reduced. This reduced load increases the life of the jack shaft bearings and blade shaft drive bearings. While blade (47) is shown for the sake of illustration, other tools may be used such as abrasive grinding wheels and the like.

Another advantage of this double reduction drive system is the inherent efficiency of the high torque positive drive toothed belt and gear drive which minimizes energy losses. While it may seem desirable to use such toothed drives throughout the entire power train, this is not necessarily the case since such toothed drives provide little accommodation for shock loading such as that frequently encountered in pavement cutting drive systems. However, the v-belts and v-pulleys are well suited to accommodate such shock loading by slipping under these loads, thereby providing a necessary safety feature to the present invention.

Obviously, numerous modifications and variations of the present invention are possible in light of the above teachings. It is therefore to be understood that within the scope of the appended claims, the invention may be practiced otherwise than as specifically described herein. For example, the power train may be used with other types of machinery such as garden cultivators and snow blowers.

What is claimed is:

1. A power train for a cutting device having rotary tool means for cutting or abrading pavement and the like, comprising:
   a prime mover for powering said tool means, said prime mover having a crankshaft provided with a shaft extension member;
   first pulley means provided on said shaft extension member;
   a jack shaft mounted on said cutting device for transmitting power from said prime mover to said tool means;
   second pulley means provided on said jack shaft;
   belt means frictionally interconnecting said first and second pulley means;
   first gear means mounted on said jack shaft;
   a drive shaft provided on said mobile cutting device for driving said tool means;
   second gear means mounted on said drive shaft; and
   a toothed belt engaging said first and second gear means for positively and safely transmitting high horsepower at high rotative speed from said jack shaft to said drive shaft.

2. The mobile cutting device of claim 1, wherein said shaft extension member is cantelevered from said crankshaft to facilitate installation and removal of said first pulley means.

3. The mobile cutting device of claim 1, wherein said jack shaft is displaced from said drive shaft so as to provide clearance between said second pulley means and said pavement.

4. The mobile cutting device of claim 3, wherein said jack shaft is disposed above said drive shaft.

5. The apparatus of claim 1, further comprising an auxiliary power takeoff element mounted on said shaft extension member.

6. The apparatus of claim 1, wherein said first and second pulley means and said belt means comprises a first speed reduction means for reducing the rotative speed transferred from said prime mover to said jack shaft.

7. The apparatus of claim 1, wherein said first and second gear means and said toothed belt means comprises a second speed reduction means for reducing the rotative speed transferred from said jack shaft to said drive shaft.

8. The apparatus of claim 1, wherein said toothed belt comprises a flexible elastomeric material.

9. A power train assembly adapted for use with a rotary tool powered by a prime mover, wherein said assembly comprises:
   frame means for supporting said rotary tool and said prime mover;
   a drive shaft mounted on said frame means;
   a jack shaft mounted on said frame means and aligned with said drive shaft;
   first gear means mounted on said jack shaft;
   second gear means mounted on said drive shaft;
   at least one flexible toothed belt engaged with said first and second gear means for safely and positively transmitting high horsepower at high rotative speed from said jack shaft to said drive shaft;
   first pulley means connected to said prime mover;
   second pulley means mounted on said jack shaft; and
   at least one v-belt connected to said first and second pulley means for transmitting power from said prime mover to said jack shaft.

* * * * *